(12) United States Patent
Fang et al.

(10) Patent No.: US 9,026,277 B2
(45) Date of Patent: May 5, 2015

(54) ROTOR TRACK AND BALANCE WITH IMPROVED LINEAR OPTIMIZATION

(71) Applicant: Sikorsky Aircraft Corporation, Stratford, CT (US)

(72) Inventors: Austin Fang, Fairfield, CT (US); Steven P. Lozano, Wolcott, CT (US); James N. Rozak, Cheshire, CT (US); Marlene T. Drost, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 14/025,101

(22) Filed: Sep. 12, 2013

(65) Prior Publication Data

US 2015/0073627 A1   Mar. 12, 2015

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B64C 19/00* | (2006.01) |

(52) U.S. Cl.
CPC .................................. *B64C 19/00* (2013.01)

(58) Field of Classification Search
CPC .... G01C 23/00; G01C 23/005; G08G 5/0021; G08G 5/0052; G08G 5/0013
USPC ............................................................ 701/3
See application file for complete search history.

(56) References Cited

U.S. PATENT DOCUMENTS

| | | | |
|---|---|---|---|
| 4,937,758 A | | 6/1990 | Hayden et al. |
| 6,415,206 B1 | * | 7/2002 | Ventres ........................ 700/280 |
| 7,512,463 B1 | | 3/2009 | Bechhoefer |

* cited by examiner

*Primary Examiner* — Maceeh Anwari
(74) *Attorney, Agent, or Firm* — Cantor Colburn LLP

(57) ABSTRACT

A method for reducing vibrations in an airframe of an aircraft includes determining, with a processor, information indicative of an initial error value between a desired vibration level and a measured vibration level in the airframe; determining, with the processor, an initial adjustment solution for the aircraft in response to the determining of the information for the initial error value; receiving, with the processor, information indicative of a flight response to the initial adjustment solution; combining, with the processor, disturbance signals indicative of vibration noise with the information for the flight response; determining, with the processor, a subsequent error value between the desired vibration level and a subsequent measured vibration level; and determining, with the processor, a predicted adjustment solution in response to the determining of the subsequent error value.

17 Claims, 4 Drawing Sheets

ROTOR TRACK AND BALANCE WITH IMPROVED LINEAR OPTIMIZATION

BACKGROUND

The subject matter disclosed herein relates generally to the field of rotating blades and, more particularly, to a heuristic based linear optimization algorithm for rotor track and balance of rotor blades in a rotary-wing aircraft.

DESCRIPTION OF RELATED ART

Rotor track and balance is a process of adjusting the rotor blades of a rotary-wing aircraft in order to reduce aircraft vibration and the track spread of the rotor blades. Vibration from the rotor blades is measured in the cockpit by two sensors or accelerometers, for example, at a frequency of once per blade revolution (or one per rev) and higher harmonic vibration frequencies such as twice per blade revolution (two per rev) and three per blade revolution (three per rev). These vibrations travel through the hub into the fuselage and result in structural damage, crew fatigue, and limit a maximum forward speed of the rotorcraft. Control adjustments such as, for example, pitch control rods, trim tabs, and hub weights can influence these vibrations. Typical solutions to balance rotor blades include control adjustments that are based on one per rev frequency. Although, one per rev vibration level control adjustments reduce vibration, other higher harmonic vibrations are neglected and, as a result, are not optimal in reducing vibrations in the rotary-wing aircraft.

BRIEF SUMMARY

According to one aspect of the invention, a method for reducing vibrations in an airframe of an aircraft includes determining, with a processor, information indicative of an initial error value between a desired vibration level and a measured vibration level in the airframe; determining, with the processor, an initial adjustment solution for the aircraft in response to the determining of the information for the initial error value; receiving, with the processor, information indicative of a flight response to the initial adjustment solution; combining, with the processor, disturbance signals indicative of vibration noise with the information for the flight response; determining, with the processor, a subsequent error value between the desired vibration level and a subsequent measured vibration level; and determining, with the processor, a predicted adjustment solution in response to the determining of the subsequent error value.

According to another aspect of the invention, a system for reducing vibrations in an airframe of an aircraft having rotors, each rotor comprising a plurality of blades, wherein each of the plurality of blades is associated with a sensor; a processor; and memory having instructions stored thereon that, when executed by the processor, cause the system to: determine, with the processor, information indicative of an initial error value between a desired vibration level and a measured vibration level in the airframe; determine, with the processor, an initial adjustment solution for the aircraft in response to the receiving of the information on the initial error value; receive, with the processor, information indicative of a flight response to the initial adjustment solution; combine, with the processor, disturbance signals indicative of vibration noise with the flight response information; determine, with the processor, a subsequent error value between the desired vibration level and a subsequent measured vibration level; and determine, with the processor, a predicted adjustment solution in response to the determining of the subsequent error value.

According to another aspect of the invention, a computer program product having a tangible storage medium readable by a processor and storing instructions for execution by the processor for performing a method includes: determining, with the processor, information indicative of an initial error value between a desired vibration level and a measured vibration level in the airframe; determining, with the processor, an initial adjustment solution for the aircraft in response to the receiving of the information on the initial error value; receiving, with the processor, information indicative of a flight response to the initial adjustment solution; combining, with the processor, disturbance signals indicative of vibration noise with the flight response information; determining, with the processor, a subsequent error value between the desired vibration level and a subsequent measured vibration level; and determining, with the processor, a predicted adjustment solution in response to the determining of the subsequent error value.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
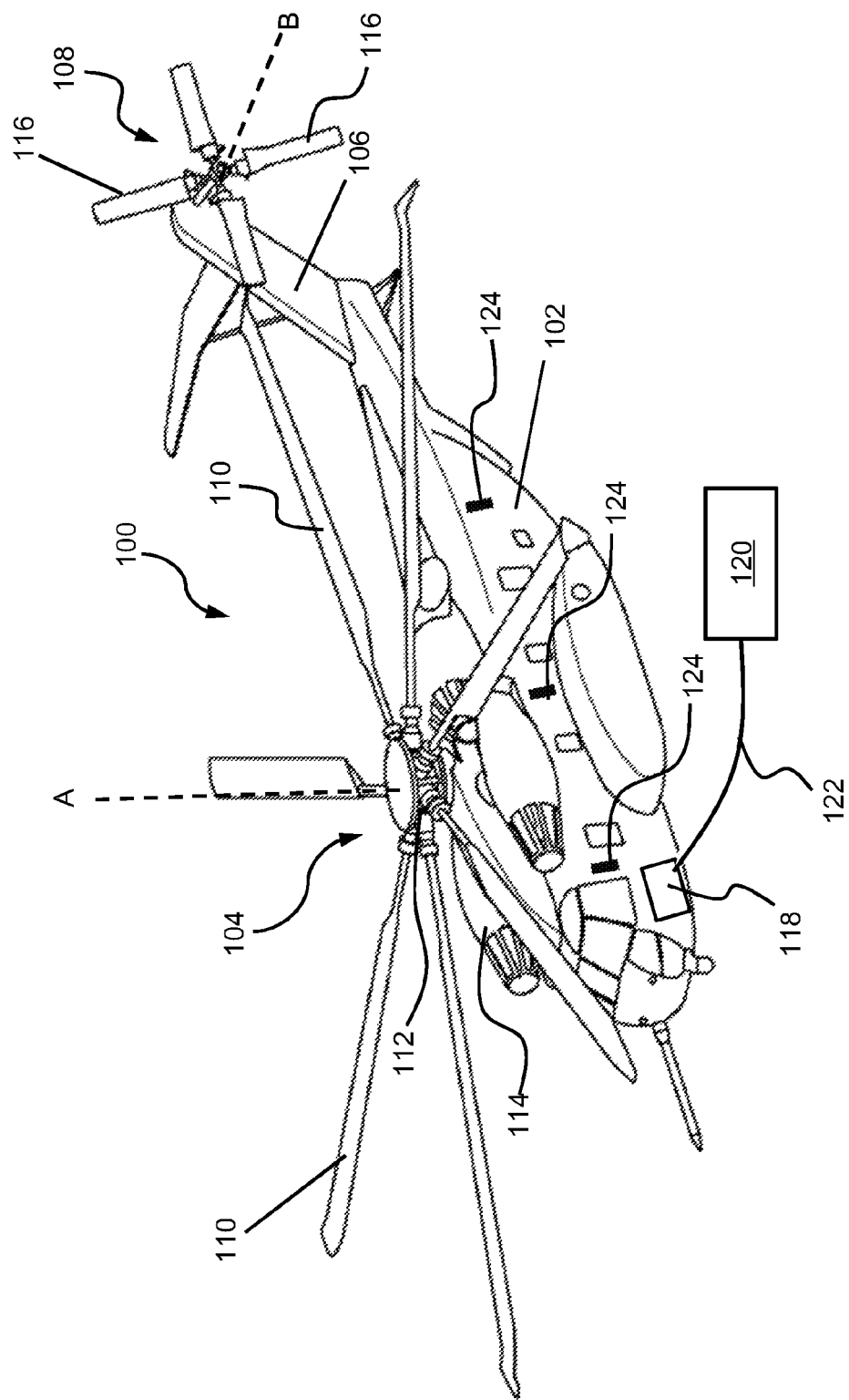
FIG. 1 is a perspective view of an exemplary rotary wing aircraft for use with embodiments of the invention.

Referring now to the drawings, FIG. 1 illustrates a general perspective view of an exemplary vehicle in the form of a vertical takeoff and landing (VTOL) rotary-wing aircraft 100 for use implementing a linear optimization algorithm for rotor track and balance (RTB) according to an embodiment of the invention. As illustrated, the rotary-wing aircraft 100 includes an airframe 102 having a main rotor assembly 104 and an extending tail 106 which mounts an anti-torque system, such as a tail rotor assembly 108. In embodiments, the anti-torque system may include a translational thrust system, a pusher propeller, a rotor propulsion system, or similar. The main rotor assembly 104 includes a plurality of rotor blades 110 mounted to a rotor hub 112 that rotates about axis A. Also, tail rotor assembly 108 includes a plurality of rotor blades 116 that rotates about axis B. The main rotor assembly 104 and the tail rotor assembly 108 are driven to rotate by one or more engines 114 through one or more gearboxes (not shown). Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

The rotary-wing aircraft 100 includes a flight control computer (FCC) 118 in data communication with a vibration processor unit 120 through a communication bus 122 although, in another embodiment, FCC 118 may communicate wirelessly with vibration processor unit 120. Further, while shown as external to the airframe 102, it is understood that the vibration processor unit 120 can be internal to the airframe 102 in other aspects. In an embodiment, the FCC 118 stores harmonic vibrations that are measured through multiple sensors 124, for example accelerometers, which are located throughout the rotary-wing aircraft 100. It is to be appreciated that a second pair of sensors 124 are provided in a same location on an opposite side of the airframe 102. In other embodiments, any number of additional sensors that are substantially similar to sensor 124 may be provided. The FCC 118 stores and processes, in one non-limiting embodiment, measurements of a flight completed on the rotary wing aircraft that is flown through different flight regimes including data measured for one per rev (1/rev or 1P) harmonic vibrations and vibrations at higher harmonic frequencies such as, for example, two per rev (2/rev or 2P) and three per rev (3/rev or 3P). The FCC 118 interfaces with vibration processor unit 120 through the communication bus 122 in order to communicate signals representative of harmonic vibration data between FCC 118 and vibration processor unit 120. As a result of harmonic vibration data flow between FCC 118 and vibration processor unit 120, the linear optimization algorithms described in exemplary embodiments may be implemented in vibration processor unit 120 or, alternatively; certain aspects of the linear optimization algorithm may be implemented in FCC 118 while other aspects mat be implemented in vibration processor unit 120. Although a particular configuration for rotary-wing aircraft 100 is illustrated and described in the disclosed embodiments, other rotating configurations and/or machines utilizing rotating rotor blades such as, for example, turbine engines, wind turbines, compound rotary wing aircraft, dual contra-rotating rotary aircraft, tilt-rotors and tilt-wing aircraft, and fixed wing aircraft, will also benefit from embodiments of the invention.

Figure 2:
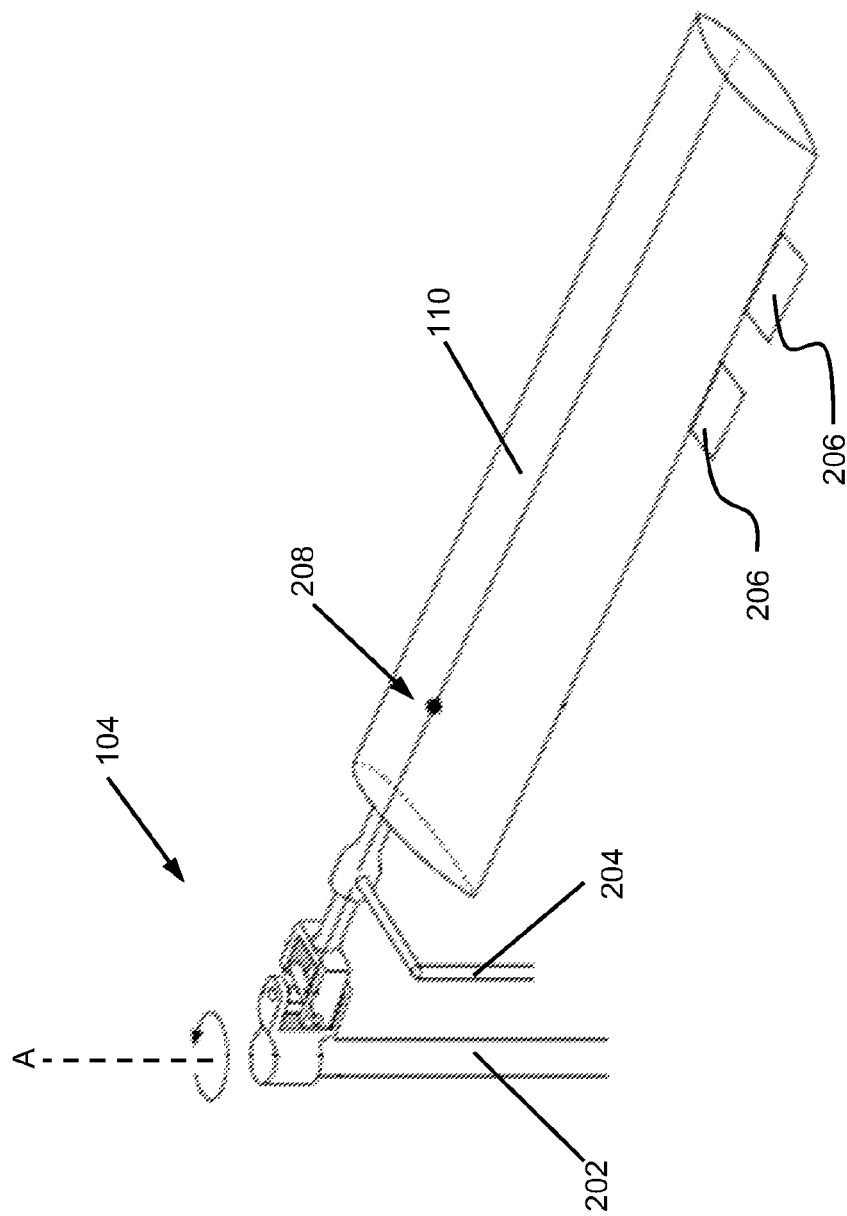
FIG. 2 is a partial perspective view of rotor adjustments for an example rotor according to an embodiment of the invention.

FIG. 2 illustrates a partial perspective view of a rotor assembly 104 with control adjustments made to an exemplary rotor blade 110 according to an embodiment of the invention. The control adjustments ensure track and balance capability after, for example, patching, reconstruction, repairs, or modifications to rotor blade 110. As illustrated, rotor assembly 104 includes rotor shaft 202 connected to rotor blade 110 which drives the rotor blade 110 for rotation about axis A. In an embodiment, control adjustments to rotor blade 110 may include adjusting a pitch control rod 204, adjusting a trim tab 206, and adjusting a hub weight 208 such as, for example, an addition or a removal of hub weight 208. In an embodiment, the control adjustments may include additional controls for processing by linear optimization algorithm without departing from the scope of the invention. Also, control adjustments for minimizing harmonic vibrations to the rotary-wing aircraft 100 (FIG. 1) may be implemented at the end of flight in order to compensate for harmonic vibrations experienced during flight, although it is appreciated that such adjustments could also be made using test stand data, using simulations of a flight, or for vibrations detected while doing other ground tests.

As illustrated, pitch control rod 204 is coupled to rotor shaft 202 at a proximal end of rotor blade 110. The pitch control rod 204 may be extended or contracted by a certain number of notches in order to alter a nominal angle of attack of rotor blade 110. Also, one or more trim tabs 206 may be coupled to a trailing edge at a distal end of the rotor blade 110. The trim tabs 206 may be adjusted by bending the trim tabs 206 upwards or downwards in order to affect an aerodynamic pitch moment of the blade. In an embodiment, trim tabs 206 may include inboard or outboard trim tabs. Also, hub weights 208 may be added or removed for static balance in order to tune vibrations through changes in the center of gravity of the rotor hub 112 (FIG. 1).

Figure 3:
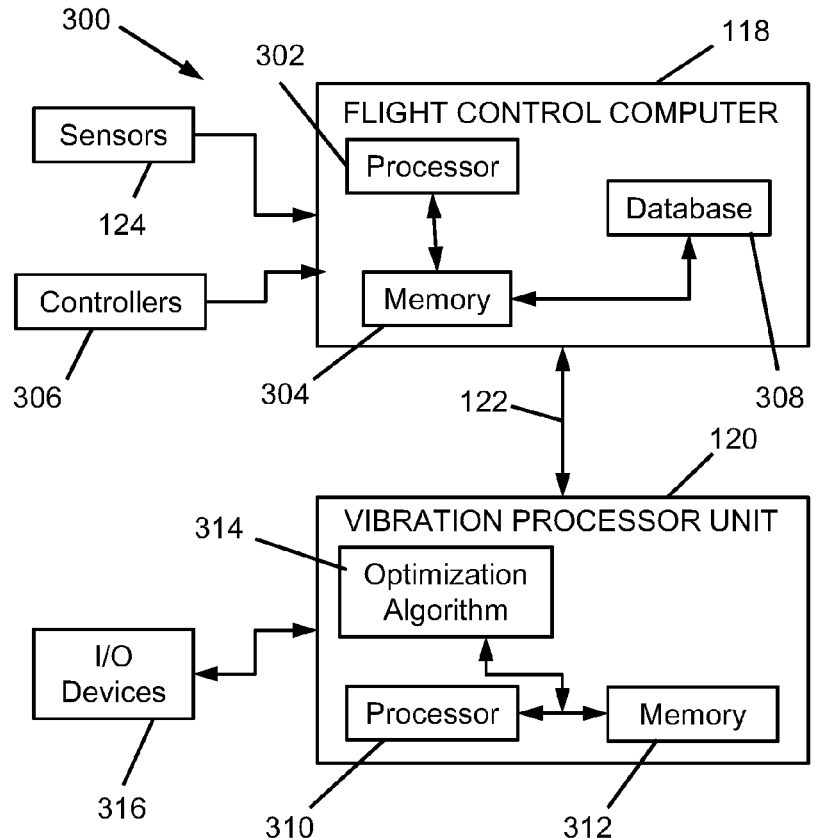
FIG. 3 is a schematic view of an exemplary system for implementing a linear optimization algorithm according to an embodiment of the invention.

FIG. 3 illustrates a schematic block diagram of a rotor track and balance (RTB) system 300 for implementing the linear optimization algorithm for RTB according to an exemplary embodiment. As illustrated, the RTB system 300 includes FCC 118 in data communication with vibration processor unit 120 over communication bus 122. The FCC 118 includes a processor 302 which communicates with memory 304. The processor 302 receives pilot command signals of a collective and cyclic controllers 306, and stores, in database 308, sensed parameter signals and operating conditions for rotary-wing aircraft 100 (FIG. 1). The database 308 may be used to temporarily or permanently store data, to provide a record or log of the data stored therein for subsequent examination or analysis, etc. While shown as internal to the FCC 118, it is understood that the database 308 can be external to the FCC 118 or removably connectable to the FCC 118. In some embodiments, the database 308 may store a relationship between data, such as one or more links between data or sets of data acquired through the sensors 124 on board rotary-wing aircraft 100 (FIG. 1). In an embodiment, sensed parameter signals include 1/rev, 2/rev, and 3/rev harmonic vibrations for a flight completed on rotary-wing aircraft 100 that is flown through different flight regimes as well as operating conditions such as, for example, lateral acceleration, attitude, angular rate, and magnitude and direction of wind speed relative to the rotary-wing aircraft 100. In an embodiment, six sensors 124 capture and store 1P, 2P, and 3P harmonics for a combination of derived vertical, derived roll, pilot vertical, copilot vertical, pilot heel vertical, and pilot lateral vibrations for different flight regimes such as for example, ground, hover, 125 knots, 145 knots, and 155 knots. In an embodiment, processor 304 executes instructions for producing a desired stability response and flight augmentation as well as communicating with sensors 124 in order to capture sensor data in order to implement, in one embodiment, linear optimization algorithm 314.

Also illustrated, RTB system 300 includes the vibration processor unit 120 in data flow communication with the FCC 118 over the communication bus 122, including data flow communication between the database 308 and the optimization algorithm 314. The vibration processor unit 120 includes processor 310 which communicates with a memory 312. The memory 312 may store the linear optimization algorithm 314 as executable instructions that are executed by processor 310. The instructions may be stored or organized in any manner and at any level of abstraction, such as in connection with the execution of the linear optimization algorithm 314. In an embodiment, the processors 302, 310 may be any type of processor (CPU), including a general purpose processor, a digital signal processor, a microcontroller, an application specific integrated circuit, a field programmable gate array, or the like. In an embodiment, the processors 302, 310 may include an image processor in order to receive images and process the associated image data using one or more processing algorithms to produce one or more processed signals. Also, in embodiments, memory 304, 310 may include random access memory (RAM), read only memory (ROM), or other electronic, optical, magnetic, or any other computer readable medium onto which is stored the mixing algorithm described below. The system 300 may provide one or more controls, such as RTB controls on one or more input/output (I/O) devices 316. The I/O devices 316 may include a display device or screen, audio speakers, a graphical user interface (GUI), etc. In some embodiments, the I/O devices 316 may be used to enter or adjust a linking between data or sets of data. It is to be appreciated that the system 300 is illustrative. In some embodiments, additional components or entities not shown in FIG. 3 may be included. In some embodiments, one or more of the components or entities may be optional. In some embodiments, the components or entities of the system 300 may be arranged or configured differently from what is shown in FIG. 3. For example, in some embodiments the I/O device(s) 316 may be commanded by processor 302, as opposed to being commanded by processor 310 as shown in FIG. 3.

Figure 4:
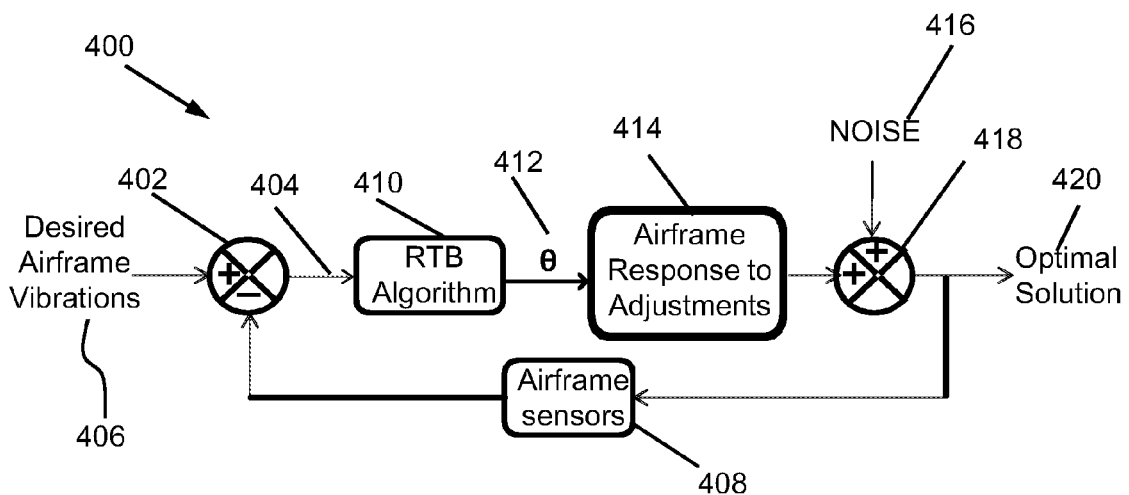
FIG. 4 is a flow diagram of a tuning strategy for rotor track and balance according to an embodiment of the invention.

FIG. 4 is a flow diagram of a rotor track and balance (RTB) tuning strategy 400 for providing an optimal solution for reducing vibration levels measured in an airframe 102 (FIG. 1) of rotary-wing aircraft 100 (FIG. 1) through multiple sensors at multiple frequencies throughout the operating flight regimes for a rotary-wing aircraft 100 (FIG. 1) according to an embodiment of the invention. As illustrated, tuning strategy 400 is an iterative process for reducing airframe vibrations by determining predicted control adjustments to be made to the airframe 102 (FIG. 1) in order to arrive at an optimal solution 420 for $\vec{Z}_{k+1}$ for a subsequent flight iteration k+1. The predicted control adjustments include adjustments to pitch control rods (PCR), trim tabs (Tab), and hub weights (HubWt) through a minimum number of iterative processing cycles. The tuning strategy 400 provides an optimal solution 420 where an end user does not require prior knowledge of control adjustments that have to be made to the rotary-wing aircraft 100 (FIG. 1) in order to come up with the optimal solution 420.

Initially, a signal for error value 404 is determined in difference block 402. Error value 404 is a difference between signal data representing desired airframe vibrations 402 and signal data representing measured airframe vibrations 408 received with sensors 124 (FIG. 2) for one or more controls.

The error value 404 is fed as a signal to a linear optimization algorithm block 410. Linear optimization algorithm block 410 implements a linear optimization algorithm that was disclosed in the embodiments of FIGS. 1 and 3 and determines an adjustment solution 412 (i.e., θ) by processing the error value 404 through a minimum number of processing cycles. Equations (1) and (2) depict a calculation for adjustment solution 412 (or θ).

$$\vec{Z}_{k+1} = \vec{Z}_k + T\hat{\theta}_k \quad (1)$$

$$\Delta \hat{Z}(k) = T\theta(k) \quad (2)$$

where:
$\vec{Z}_{k+1}$ is a predicted vibration measurement for a subsequent flight;
$\vec{Z}_k$ is a complex vector of current vibration measurements for a first flight;
T is an airframe response matrix ("T-Matrix");
$\hat{\theta}$ is a control input complex vector;
k is a flight iteration;
$\Delta\hat{Z}(k)$ is an estimated measurement change resulting from a control adjustment; and
θ is an adjustment solution.

Also, the airframe response matrix T is an m×n matrix comprised of sensitivity coefficients that relate a unit of control adjustment to airframe response to adjustments 414 for 1P, 2P, and 3P vibrations, sensors in rotary-wing aircraft 100 (FIG. 1), and flight regimes. The data in T-Matrix is gathered for a prototype rotary-wing aircraft during flight testing by adjusting individual controls, for example, pitch control rods, trim tabs, hub weights, and measuring the change in vibration on a subsequent flight for the rotary-wing aircraft model. As an example, a 10 Notch pitch control rod adjustment on a blade may influence sensor vibrations at 145 knots for 1P 0.50 inch per second (ips) at 90 degrees phase. A structure of a T-matrix is shown below.

$$\begin{bmatrix} PCR, 1P, \text{Cockpit } Vert, \text{Ground} & Tab, 1P, \text{Cockpit } Vert, & HubWt, 1P, \text{Cockpit } Vert, \\ PCR, 1P, \text{Cockpit Roll, Ground} & \ldots & \\ PCR, 1P, \text{Pilot } Vert, \text{Ground} & & \\ PCR, 1P, \text{Copilot } Vert, \text{Ground} & & \\ PCR, 1P, \text{Pilot Heel } Vert, \text{Ground} & & \\ PCR, 1P, \text{Pilot } Lat, \text{Ground} & & \\ PCR, 1P, \text{Pilot } Lat, \text{Hover} & & \\ \vdots & & \\ PCR, 2P, \text{Cockpit } Vert, \text{Ground} & \vdots & \\ \vdots & & \\ PCR, 3P, \text{Cockpit } Vert, \text{Ground} & & \\ \vdots & & \\ PCR, 3P, \text{Pilot } Lat, 155 \text{ kts} & \ldots & HubWt, 3P, \text{Pilot } Lat, 155 \end{bmatrix}$$

To solve for θ, an objective scalar cost function J for a minimum variance control algorithm is established according to Equation (3) with weighting matrices $W_z$, $W_\theta$ for respective measurements and control adjustments.

$$J = Z(k)^T W_z Z(k) + \theta(k)^T W_\theta \theta(k) \quad (3)$$

where:
J is a sum of the weighted squares of the vibration measurements and the control adjustments;
$W_z$ is a diagonal weighting matrix for measured vibration that are chosen to influence optimization $W_\theta$ is a diagonal weighting matrix for a combination of control adjustments that are chosen to influence optimization A structure of measurements weighting matrix $W_z$ and controls weighting matrix $W_\theta$ is shown below $$W_z = \begin{bmatrix} W_{z1P} & 0 & 0 \\ 0 & W_{z2P} & 0 \\ 0 & 0 & W_{z3P} \end{bmatrix}$$

$$W_\theta = \begin{bmatrix} W_{PCR} & 0 & 0 \\ 0 & W_{Tabs} & 0 \\ 0 & 0 & W_{HubWts} \end{bmatrix}$$

To solve for J, a partial derivative of J with respect to θ is taken and setting the result to 0, the control adjustment solution 412 is found by solving for θ, shown in equation (4):

$$\theta(k) = -\{T^T W_z T + W_\theta\}^{-1} \cdot \{T^T W_z Z(k)\} \quad (4)$$

The adjustment solution 412 is implemented as one or more control adjustments for pitch control rods ("PCR"), trim tabs ("Tab"), and hub weights ("HubWt"). The control adjustments are made as signals to rotary-wing aircraft 100 (FIG. 1) and the airframe response to adjustments 414 are measured as vibration signals with sensors 124 (FIG. 1). Additionally, vibration noise and disturbance signals 416 in sensor data are added to airframe response to adjustments 414 in summation block 418 and is fed back to difference block 402 as measured airframe vibrations 408. The resulting change in error value 404 is used to predict subsequent vibration measurements and is depicted in Equation (5).

$$\hat{Z}(k+1) = Z(k) + \Delta \hat{Z}(k) \quad (5)$$

where:
$\hat{Z}(k+1)$ is a resulting change that is used to predict vibration measurements for a subsequent flight iteration The tuning strategy 400 is repeated to determine a predicted solution for a subsequent flight iteration $\hat{\theta}$ θk until an optimal solution 420 is obtained which minimizes scalar cost function J.

Figure 5:
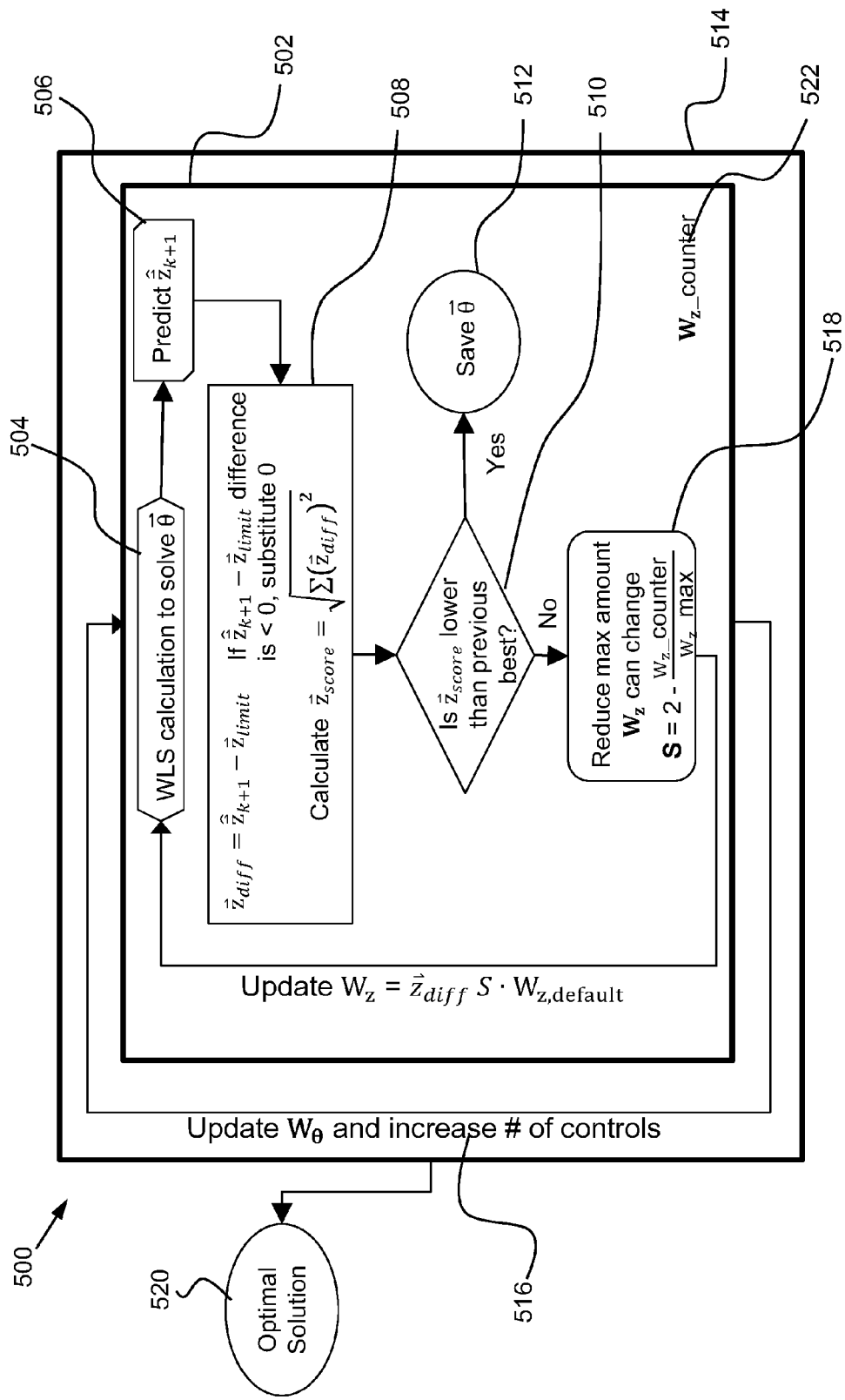
FIG. 5 is a flow diagram of a process for implementing a linear optimization algorithm according to an embodiment of the invention.

FIG. 5 illustrates an exemplary flow diagram of a process 500 for implementing a linear optimization algorithm that may be performed by vibration processor unit 120 (FIG. 3) according to an embodiment of the invention. Particularly, the process 500 implements a simulated annealing approach in order to implement a least squares fit for a combination of control adjustments and dynamically changes weights for control adjustments and vibrations during the process 500. As illustrated, process 500 is initiated at inner loop 502 where the weighting matrix Wz is determined for subsequent flight iterations k+1. The weighting matrix Wz is determined from an initial weighting matrix $W_\theta$ with one or more control adjustments being implemented. Particularly, weighting matrix $W_\theta$ sets which control adjustments to use for determining Wz in inner loop 502. The weighting matrix $W_\theta$ may include combinations of sensors, flight regimes, etc. based on user preferences as to importance and hence weight such as, for example, importance of a sensor and vibration in a particular location of rotary-wing aircraft 100 (FIG. 1), or reducing vibration for a particular flight regime that is to be implemented by the linear algorithm, In 504, a Weighted Least Squares (WLS) calculation/computation is performed by processor 310 in vibration processor unit 120 (FIG. 3) for an initial combination of control adjustments such as, for example, a PCR adjustment to rotor blade 110 (FIG. 2) for an initial counter value n of counter 522. In 506, a predicted or estimated vibration measurement $\vec{z}_{k+1}$ is determined for the combination of control adjustments for a next flight iteration k+1. In 508, a difference between the estimated vibration measurement $\vec{z}_{k+1}$ and selected or predefined vibration limits (or desired airframe vibrations 506 in FIG. 4) $\vec{z}^{limit}$ is determined according to Equation (6)

$$\vec{z}_{diff} = \vec{z}_{k+1} - \vec{z}_{limit} \quad (6)$$

Where:
$\vec{z}_{diff}$ is a difference between estimated vibration measurement and selected vibration limits Also, if the difference $\vec{z}_{diff}$ is less than zero (0), the weighting for the control adjustment is set to zero (0) (i.e., Wz=0). However, if the difference $\vec{z}_{diff}$ is greater than zero (0), the weighting in weighting matrix Wz is set proportionally to how much greater it is. In this way, the linear optimization algorithm may dynamically change how matrices Wz and Wθ are updated during each iteration of inner loop 502. Also, a scoring metric $\vec{z}_{score}$ is calculated or determined from the difference $\vec{z}_{diff}$ according to Equation (7). The scoring metric $\vec{z}_{score}$ is a performance metric used to gauge the effectiveness of optimization using a combination of control adjustments for control adjustments such as, for example, regimes, harmonic vibrations, and sensors in order to reduce 1P, 2P and 3P vibrations.

$$\vec{z}_{score} = \sqrt{\Sigma (\vec{z}_{diff})^2} \quad (7)$$

Also, larger differences in $\vec{z}_{diff}$ are weighted higher and weighting is reduced for sensor, harmonic and flight regime combinations that have very low harmonic vibrations. If at 510, the $\vec{z}_{score}$ at count n+1 is less than the $\vec{z}_{score}$ at count n, the processor 310 stores the adjustment solution for the combination of control adjustments as an estimated adjustment solution $\hat{\theta}$ in 512. The estimated adjustment solution $\hat{\theta}$ is sent to outer loop 514 in order to update the weighting matrix for adjustment solution $W_\theta$ in 516 for the combination of control adjustments. Also, in 516, the combination of control adjustments is increased to add one or more additional controls such as, for example, pitch control rod, trim tab, hub weight, and the process is run with the additional controls.

However, if $\vec{z}_{score}$ at count n+1 is greater than the $\vec{z}_{score}$ at count n, then in 518, the processor 310 (FIG. 1) reduces a maximum value that weighting matrix $W_z$ may change for a next iterative loop of inner loop 502. Initially, weighting matrix $W_z$ may be permitted to vary up to a maximum number such as, for example, 2. However, for each iteration through inner loop 502 with incrementing counter 522, the maximum amount of change in weighting is decreased in order to converge towards an optimal solution. For each cycle through inner loop 502, $W_z$ is updated as a function of $\vec{z}_{diff}$, S, and initial weighting $W_{z,default}$ according to Equations (8) and (9)

$$S = 2 - \frac{W_{z\_counter}}{W_{z\_max}} \quad (8)$$

$$W_z = \vec{z}_{diff} * S * W_{z,default} \quad (9)$$

The linear optimization algorithm as depicted in process 500 may loop through inner and outer loops 502, 514 and dynamically change the weightings for cells by increasing or decreasing the weightings and the magnitudes until an optimal solution 520 is determined. It is to be appreciated that the optimal solution 520 provides a control combination that is the least amount of control adjustments with a best overall $\vec{z}_{score}$. In this manner, aspects of the invention allow for the investigation of specific harmonics, and can also allow for attenuation in specific locations (such as reducing harmonics in specific areas such as the cabin more than in other areas such as the tail).

The terminology used herein is for the purpose of describing particular embodiments only and is not intended to be limiting of the invention. While the description of the present invention has been presented for purposes of illustration and description, it is not intended to be exhaustive or limited to the invention in the form disclosed. For instance, aspects of the invention are not limited to rotorcraft, and can be used in wind turbines, engine turbines, and other systems with rotary elements. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for reducing vibrations in an airframe of an aircraft, comprising:
   determining, with a processor, information indicative of an initial error value between a desired vibration level and a measured vibration level in the airframe;
   determining, with the processor, an initial adjustment solution for the aircraft in response to the determining of the information for the initial error value;
   receiving, with the processor, information indicative of a flight response to the initial adjustment solution;
   combining, with the processor, disturbance signals indicative of vibration noise with the information for the flight response;
   determining, with the processor, a subsequent error value between the desired vibration level and a subsequent measured vibration level; and
   determining, with the processor, a predicted adjustment solution in response to the determining of the subsequent error value comprising (i) determining an initial control adjustment matrix in response to the determining of the initial adjustment solution and (ii) determining a measured vibration matrix from the initial control adjustment matrix.

2. The method of claim 1, further comprising updating the measured vibration matrix to form an updated vibration matrix.

3. The method of claim 2, wherein the updating of the measured vibration matrix further comprises:
   calculating a weighted least squares on the initial control adjustment matrix.

4. The method of claim 1, wherein the determining of the predicted adjustment solution further comprises:
   determining predicted vibration values for an adjustment to a pitch control rod, a trim tab, a hub weight, or combinations thereof.

5. The method of claim 1, wherein the determining of the predicted adjustment solution further comprises:
   determining a performance value for the predicted adjustment solution.

6. The method of claim 5, wherein the determining of the performance value further comprises:
   determining a value indicative of a difference between an estimated vibration measurement and the desired vibration level.

7. The method of claim 1, wherein the determining of the predicted adjustment solution further comprises:
   receiving signals from multiple sensors coupled to the airframe, the received signals being indicative of harmonic vibration measurements for one per rev vibration, two per rev vibrations, three per rev vibrations, or combinations thereof.

8. The method of claim 1, wherein the determining of the predicted adjustment solution further comprises:
   updating the initial control adjustment matrix to form an updated control adjustment matrix.

9. A system for reducing vibrations in an airframe of an aircraft, comprising:
   rotors, each rotor comprising a plurality of blades, wherein each of the plurality of blades is associated with a sensor;
   a processor; and
   memory having instructions stored thereon that, when executed by the processor, cause the system to:
     determine, with the processor, information indicative of an initial error value between a desired vibration level and a measured vibration level in the airframe;
     determine, with the processor, an initial adjustment solution for the aircraft in response to the receiving of the information on the initial error value;
     receive, with the processor, information indicative of a flight response to the initial adjustment solution;
     combine, with the processor, disturbance signals indicative of vibration noise with the flight response information;
     determine, with the processor, a subsequent error value between the desired vibration level and a subsequent measured vibration level; and
     determine, with the processor, a predicted adjustment solution in response to the determining of the subsequent error value,
     wherein the processor is configured to determine an initial control adjustment matrix in response to the determining of the initial adjustment solution, and
     wherein the processor is configured to determine a measured vibration matrix from the initial control adjustment matrix.

10. The system of claim 9, wherein the processor is configured to update the measured vibration matrix to form an updated vibration matrix.

11. The system of claim 10, wherein the processor is configured to calculate a weighted least squares on the initial control adjustment matrix.

12. The system of claim 9, wherein the processor is configured to predict vibration values for an adjustment to a pitch control rod, a trim tab, a hub weight, or combinations thereof.

13. The system of claim 9, wherein the processor is configured to determine a performance value for the predicted adjustment solution.

14. The system of claim 13, wherein the processor is configured to determine a value indicative of a difference between an estimated vibration measurement and the desired vibration level.

15. The system of claim 9, wherein the processor is configured to receive signals from multiple sensors coupled to the airframe, the received signals being indicative of harmonic vibration measurements for one per rev vibration, two per rev vibrations, three per rev vibrations, or combinations thereof.

16. The system of claim 9, wherein the processor is configured to update the initial control adjustment matrix to form an updated control adjustment matrix.

17. A method for reducing vibrations in an airframe of an aircraft, comprising:

determining, with a processor, information indicative of an initial error value between a desired vibration level and a measured vibration level in the airframe;

determining, with the processor, an initial adjustment solution for the aircraft in response to the determining of the information for the initial error value;

receiving, with the processor, information indicative of a flight response to the initial adjustment solution;

combining, with the processor, disturbance signals indicative of vibration noise with the information for the flight response;

determining, with the processor, a subsequent error value between the desired vibration level and a subsequent measured vibration level; and determining, with the processor, a predicted adjustment solution in response to the determining of the subsequent error value comprising (i) determining a performance value for the predicted adjustment solution and (ii) determining a value indicative of a difference between an estimated vibration measurement and the desired vibration level.

* * * * *